(12) United States Patent
Tran et al.

(10) Patent No.: US 11,362,972 B2
(45) Date of Patent: Jun. 14, 2022

(54) SYSTEMS AND METHODS FOR MESSAGING PATIENT INFORMATION IN MEDICAL SYSTEM ENVIRONMENTS

(71) Applicant: THE JOHNS HOPKINS UNIVERSITY, Baltimore, MD (US)

(72) Inventors: Cao-Ly Tran, Towson, MD (US); Dwight Raum, Forest Hill, MD (US); John W. Scott, Baltimore, MD (US); Joshua G. Spangler, Baltimore, MD (US); Kelly L. Bystry, Parkton, MD (US); Kirby S. Smith, Towson, MD (US); Marc A. Amick, Hampstead, MD (US); Philip J. Gianuzzi, Baltimore, MD (US); Charles E. Schmitt, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 466 days.

(21) Appl. No.: 16/306,431

(22) PCT Filed: Jun. 5, 2017

(86) PCT No.: PCT/US2017/035884
§ 371 (c)(1),
(2) Date: Nov. 30, 2018

(87) PCT Pub. No.: WO2017/210670
PCT Pub. Date: Dec. 7, 2017

(65) Prior Publication Data
US 2021/0105233 A1  Apr. 8, 2021

Related U.S. Application Data

(60) Provisional application No. 62/345,650, filed on Jun. 3, 2016.

(51) Int. Cl.
*G06F 15/16* (2006.01)
*H04L 51/066* (2022.01)
(Continued)

(52) U.S. Cl.
CPC ............ *H04L 51/066* (2013.01); *H04L 51/14* (2013.01); *H04L 51/26* (2013.01); *H04L 67/12* (2013.01); *H04W 4/12* (2013.01); *H04W 12/084* (2021.01)

(58) Field of Classification Search
CPC ....... H04L 51/14; H04L 51/26; H04L 51/066; H04L 67/12; H04W 4/12; H04W 12/084
(Continued)

(56) References Cited

U.S. PATENT DOCUMENTS 6,854,007 B1  2/2005  Hammond
7,734,705 B1*  6/2010  Wheeler, Jr. ......... G06Q 10/107
709/206

(Continued)

FOREIGN PATENT DOCUMENTS

CN         1813451      8/2006
WO    WO2015/153373    10/2015

OTHER PUBLICATIONS

Written Opinion issued in Application No. PCT/US2017/035884 dated Sep. 29, 2017.
(Continued)

*Primary Examiner* — Johnny B Aguiar
(74) *Attorney, Agent, or Firm* — DLA Piper LLP (US)

(57) ABSTRACT

A messaging server may receive message data which may comprise message information. The messaging server may generate one or more messages which may be formatted according to different endpoint protocols. The messaging server may send the messages using the same protocol as the protocol used for formatting the messages.

11 Claims, 18 Drawing Sheets

(51) Int. Cl.
  *H04W 12/084* (2021.01)
  *H04L 51/00* (2022.01)
  *H04L 51/226* (2022.01)
  *H04L 67/12* (2022.01)
  *H04W 4/12* (2009.01)
(58) Field of Classification Search
  USPC .................................. 709/206, 207; 705/2, 3
  See application file for complete search history.

(56) References Cited

U.S. PATENT DOCUMENTS

| | | | | |
|---|---|---|---|---|
| 8,990,321 | B1* | 3/2015 | Korn | H04L 51/066 709/206 |
| 2003/0169730 | A1* | 9/2003 | Narasimhan | H04M 3/53366 370/355 |
| 2004/0249250 | A1* | 12/2004 | McGee | A61B 5/0002 600/300 |
| 2005/0009541 | A1 | 1/2005 | Ye et al. | |
| 2006/0294189 | A1 | 12/2006 | Natarajan et al. | |
| 2007/0130271 | A1* | 6/2007 | Ye | H04L 51/066 709/206 |
| 2007/0168228 | A1* | 7/2007 | Lawless | G16H 40/67 705/2 |
| 2007/0287485 | A1* | 12/2007 | Klassen | G06Q 10/107 455/466 |
| 2007/0299972 | A1 | 12/2007 | Brake et al. | |
| 2008/0255874 | A1* | 10/2008 | Crooks | G16Z 99/00 705/2 |
| 2008/0306759 | A1* | 12/2008 | Ilkin | G06Q 10/10 705/2 |
| 2009/0106370 | A1 | 4/2009 | Dreyfus et al. | |
| 2009/0137229 | A1 | 5/2009 | Ye et al. | |
| 2009/0325610 | A1 | 12/2009 | Liu et al. | |
| 2011/0295961 | A1 | 12/2011 | Wilkes et al. | |
| 2012/0203569 | A1* | 8/2012 | Altman | G06Q 10/06315 705/3 |
| 2014/0379814 | A1* | 12/2014 | Graff | H04M 1/7243 709/206 |
| 2014/0379823 | A1 | 12/2014 | Wilsher et al. | |
| 2016/0073244 | A1 | 3/2016 | Long et al. | |
| 2016/0335400 | A1* | 11/2016 | Grant | H04L 63/08 |

OTHER PUBLICATIONS

International Search Report issued in Application No. PCT/US2017/035884 dated Sep. 29, 2017.
Search Report cited in Application No. EP 17807649 dated Mar. 12, 2020.
Andrew Mcgonnigle, "Complete Guide to Google drive sharing—Better Cloud Monitor", XP055673752, Retrieved from the Internet: URL: https://www.bettercloud.com/monitor/google-drive-sharing-complete-guide/, Mar. 1, 2015.
Search Report cited in Application No. EP 17807649 dated Oct. 16, 2019.
Office Action cited in Application No. EP 17807649 dated Oct. 19, 2021.

* cited by examiner

CORUS

1400

Ⓒ Alan Johnson X

Johnson [GO]

Ⓓ Filter Results by: People ⊘  Channels ⊘  Consults ⊘  Devices ⊘
| Invasive X | Pharmacy X |
| Cardiology + | Pediatrics + | JHH + | GBMC + | Bayview + |

Showing 10 results

| | Cardiology Resident<br>410.283.5180 | (Device) Clinical Cardiology Service |
| | Invasive Cardiology | (Channel) |
| | Alan Johnson<br>@ajohnsn57<br>410-550-0243 | STOREKEEPER<br>Supply Services |
| | Alan Johnson<br>@ajohns98 | BE GR Graduate<br>n/a |
| | Aleta Johnson<br>@ajohn116<br>410-338-3421 | MEDICAL ASSISTANT-CERT/REG<br>JHCP at Wyman Park Internal Medicine |
| | Alethea Johnson<br>@ajohn153<br>301-896-3339 | ASSISTANT, MEDICAL STAFF SERVICES<br>Medical Staff Office |
| | Alex Johnson<br>@ajohn190<br>410-955-8344 | Fellow/JHH Assistant Resident<br>Orthopedic Surgery |

Fig. 14

SYSTEMS AND METHODS FOR MESSAGING PATIENT INFORMATION IN MEDICAL SYSTEM ENVIRONMENTS

CROSS REFERENCE TO RELATED APPLICATIONS

This application is a U.S. National Stage Application of International Application No. PCT/US2017/035884 filed Jun. 5, 2017, which claims priority to 62/345,650, filed Jun. 3, 2016 and entitled Systems and Methods for Messaging in Medical System Environments, which is herein incorporated by reference for all purposes.

BRIEF DESCRIPTION OF THE DRAWINGS

FIGS. 8-14 are user interface screenshots according to an embodiment of the invention.

DETAILED DESCRIPTION OF SEVERAL EMBODIMENTS

Systems and methods described herein may enable secured communications between users. For example, a messaging server may provide web and mobile device-based messaging and may leverage mobile communications protocols for message send, reply, and notification to enable 2-way communications between web browser, pager, cell phone, smart phone, and voice over internet protocol (VOIP) phone user endpoints. The messaging server may enable 1:1 and 1:N direct messaging as well as group subscription messaging via programmatically defined memberships. In some embodiments, messaging server may leverage directory, user attribute, and/or electronic medical record (EMR) data as authorization criteria for group inclusion. In some embodiments, the messaging server may offer a robust, rules-based messaging queue to determine the user's appropriate notification mechanism at the point of message send, poll for message delivery, and employ repeat notification and/or escalation techniques to ensure message receipt. Administrative features within the messaging server may allow for the creation of groups, assignment of individuals to roles, creation of service accounts, scheduling of services, user forwarding preferences, and reporting of messaging activity within the application, for example.

Messages may originate within a web browser or mobile app in some embodiments. Messages may be encrypted by the sending device and transmitted to a messaging server along with the client's credentials. Messaging server may parse messages into individual records and write the records to a database. Messaging server may determine a user's in-app presence; evaluate the user's message, notification, and escalation preferences; and, if applicable, messaging server may pass the message to the message queue. For example, users active within a web browser may receive in-browser notification of unread messages, while users inactive within the web browser may receive notification of unread messages at a mobile device per individual preference. For example, messaging server may provide notification to: (1) VOIP phone will route into the customer's on-premise VOIP environment; (2) pager will route via the Internet through Wireless Communications Transfer Protocol (WCTP) to the third party pager carrier; (3) cell phone via the Internet through Short Messaging Service (SMS) to a third party aggregator to the individual's cell phone carrier; and (4) mobile app via the Internet to the device's native push notification service, such as Apple Push Notification Service or Google Cloud Messaging. Data connection between disparate components may be secured in transit. For protocols not supporting in-transit security (e.g., SMS connection), message payload may be obfuscated, requiring the recipient to authenticate to read its contents.

Figure 1:
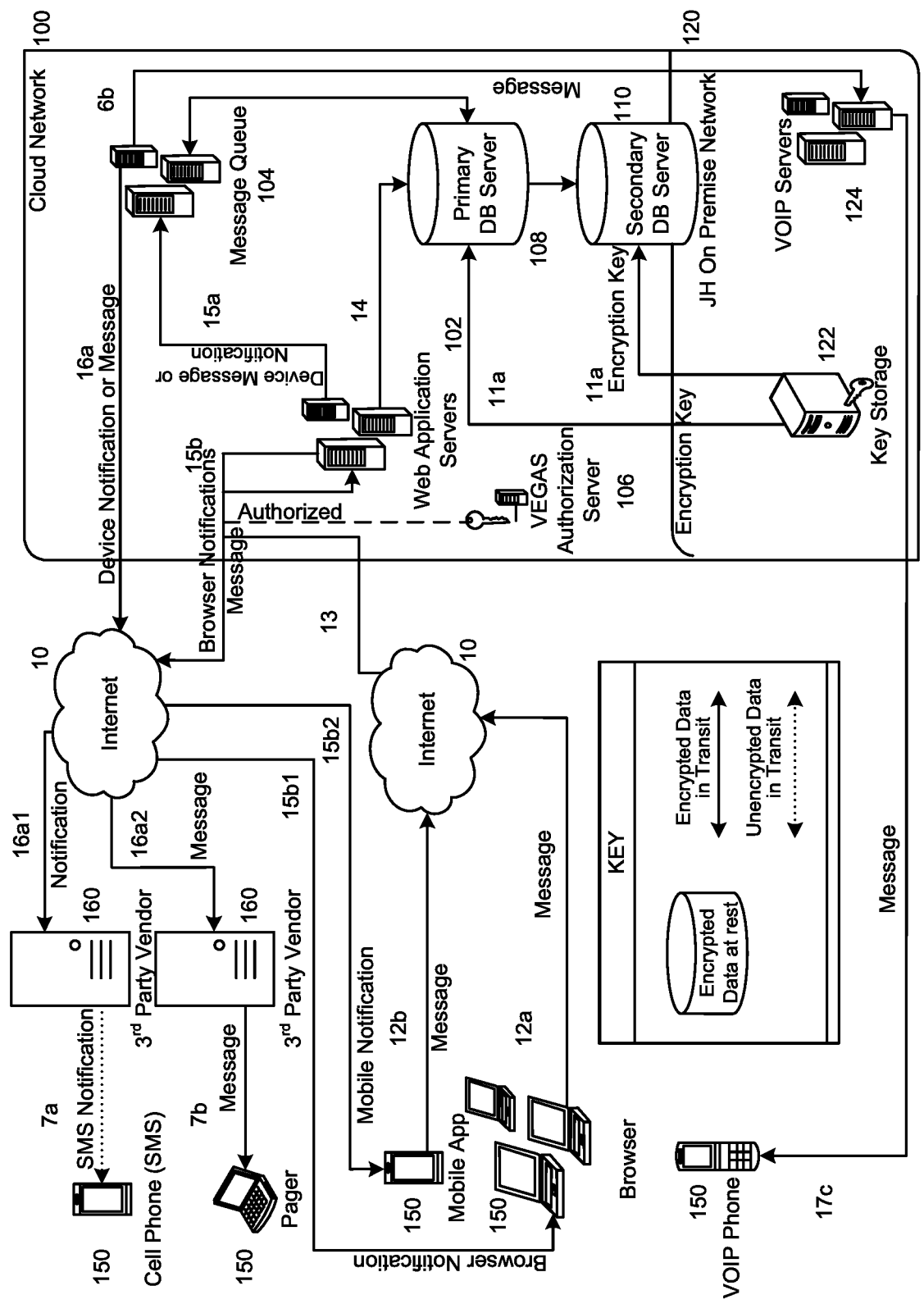
FIG. 1 is a messaging system according to an embodiment of the invention.

FIG. 1 is a messaging system according to an embodiment of the invention. The system may comprise one or more computers that may collectively form a messaging server 100 available through the cloud in some embodiments (e.g., accessible through the internet 10 or other network). The messaging server 100 may include one or more web application servers 102, message queue server 104, authorization servers 106, primary database servers 108, and/or secondary database servers 110. In some embodiments, the messaging server 100 may be in communication with an on premise network 120, which may include one or more key storage servers 122 and/or VOIP servers 124. In some embodiments, one or more elements of the on premise network 120 may be included in the messaging server 100. Through the internet 10 or other networks, the messaging server 100 may be in communication with a plurality of client devices 150 (e.g., cell phones, pagers, computers, VOIP phones, tablets, mobile devices, etc.) and/or third party messaging systems 160 (e.g., text and pager messaging systems).

The messaging server 100 may provide message notification to numerous device endpoint types. These may include, for example, pagers, cell phones, VOIP phones, web browsers, mobile apps, and/or email. The messaging server 100 may use device type-specific protocols to improve overall speed and reliability of message receipt. For example, for transmission to pagers, the messaging server 100 may use Wireless Communication Transfer Protocol (WCTP), a mechanism through which the message is sent to the paging carrier's terminal, which in turn broadcasts the message via radio waves to the paging device. Messaging to cell phones via text message may be accomplished via Short Message Service (SMS), to VOIP phones via cloud-based connection to customer's on premise VOIP system (Ascom™, Cisco™, Vocera™, Spectralink™, etc.), and to iOS and Android-based smartphones via Apple Push Notification Service (APNS)™ and Google Cloud Messaging (CGM)™. Other protocols (e.g., Simple Mail Transfer Protocol (SMTP)) may be used for devices natively supporting such protocols in some embodiments.

For example, in the current healthcare delivery organization (HDO) environment and other environments in which messaging is used, there is a heterogeneous mix of mobile device types. While the use of traditional paging has declined over the past decade, it is estimated that 85% of hospitals still utilize this technology. This, coupled with the increased trend toward bring your own device (BYOD), means that hospitals may struggle with timely communications regarding patient care. The messaging server 100 may provide bi-directional individual and group messaging between providers and care teams in a web and mobile context. To illustrate this point, consider the case of an airway emergency. In this scenario, the patient goes into distress and it's up to the nurse to quickly notify the RT who will prepare the airway, the resident who will intubate the patient, and the attending physician responsible for the patient's care plan. At the nurse's disposal is a public workstation and a VOIP phone, at the RT's disposal is a pager, at the resident's disposal is a smartphone, and at the attending's disposal is a pager forwarding SMS messages to a cell phone. The nurse does not have time to locate and notify all of these disparate modalities. Through a user interface available via web browser on the public workstation patient bedside, the nurse may be able to notify all of these individuals simultaneously. The messaging server 100 may send notification of this event too all users, who may all able to respond to the proper location within moments. For example, the nurse may instantiate a call to the below web service method to send the message to the group including both the RT, resident, and attending physician.

```
function sendMessageToGroup(groupName,message) {
    group = getGroupByName(groupName)
    for each group.members( ) {
        newQueueItem = new MessageQueueItem( );
        userDevice = member.getPreferredDevice( );
        newQueueItem.sendType = userDevice.getType( );
        newQueueItem.address = userDevice.address( );
        newQueueItem.save( );
    }
}
```

Figure 2:
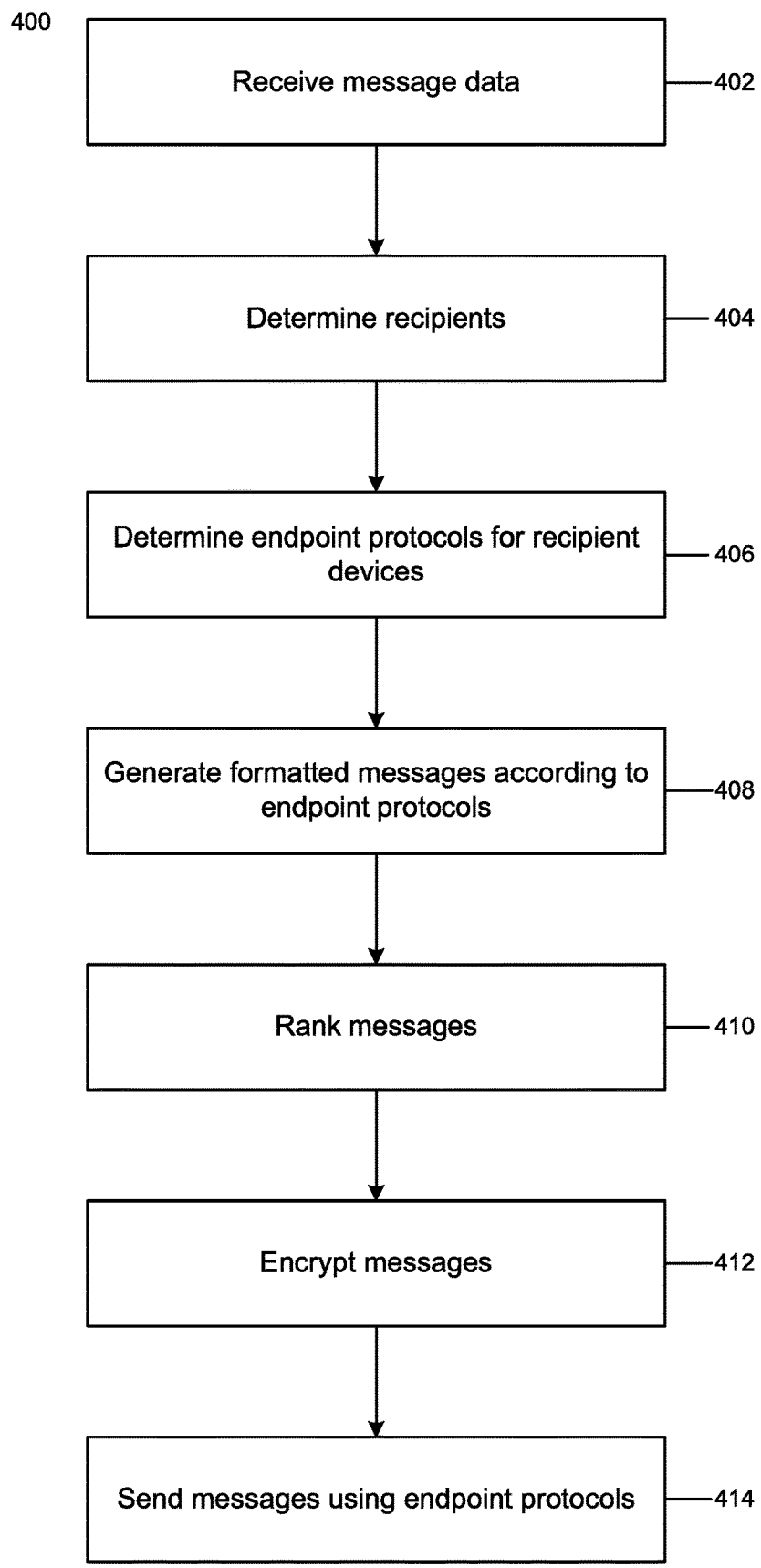
FIG. 2 is a process for formatting messages according to an embodiment of the invention.

FIG. 2 is a process 400 for formatting messages according to an embodiment of the invention. In 402, messaging server 100 may receive message data from a user device 150 (e.g., 12 and 13 of FIG. 1). In some cases, messaging server 100 may authorize the sender to verify that the sender is allowed to send messages using the messaging server (e.g., using authorization server 106 of FIG. 1).

In 404, messaging server 100 may determine the recipients of the message. In some cases, recipients may be specified by the user of the device 150 and contained in the message data. In other embodiments, recipients may be identified based on patient information contained in the message, search information contained in the message, or other data, as described in greater detail below.

In 406, messaging server 100 may determine endpoint protocols for recipient devices. For example, each identified recipient may be associated with one or more devices 150, each of which is able to receive one or more types of messages. In situations where a recipient has multiple devices, the recipient may have specified a preferred device and/or message type, or the recipient's devices may be ranked automatically or by some default ranking. Messaging server 100 may select one or more devices/types for each recipient for receiving the message.

In 408, messaging server 100 may generate a formatted message for each selected transmission. The messages may be formatted according to selected endpoint protocols. For example, a pager may receive a wireless communication transfer protocol or a simple network paging protocol message, while a cell phone may receive an SMS or Multimedia Messaging Service (MMS) message.

Figure 4:
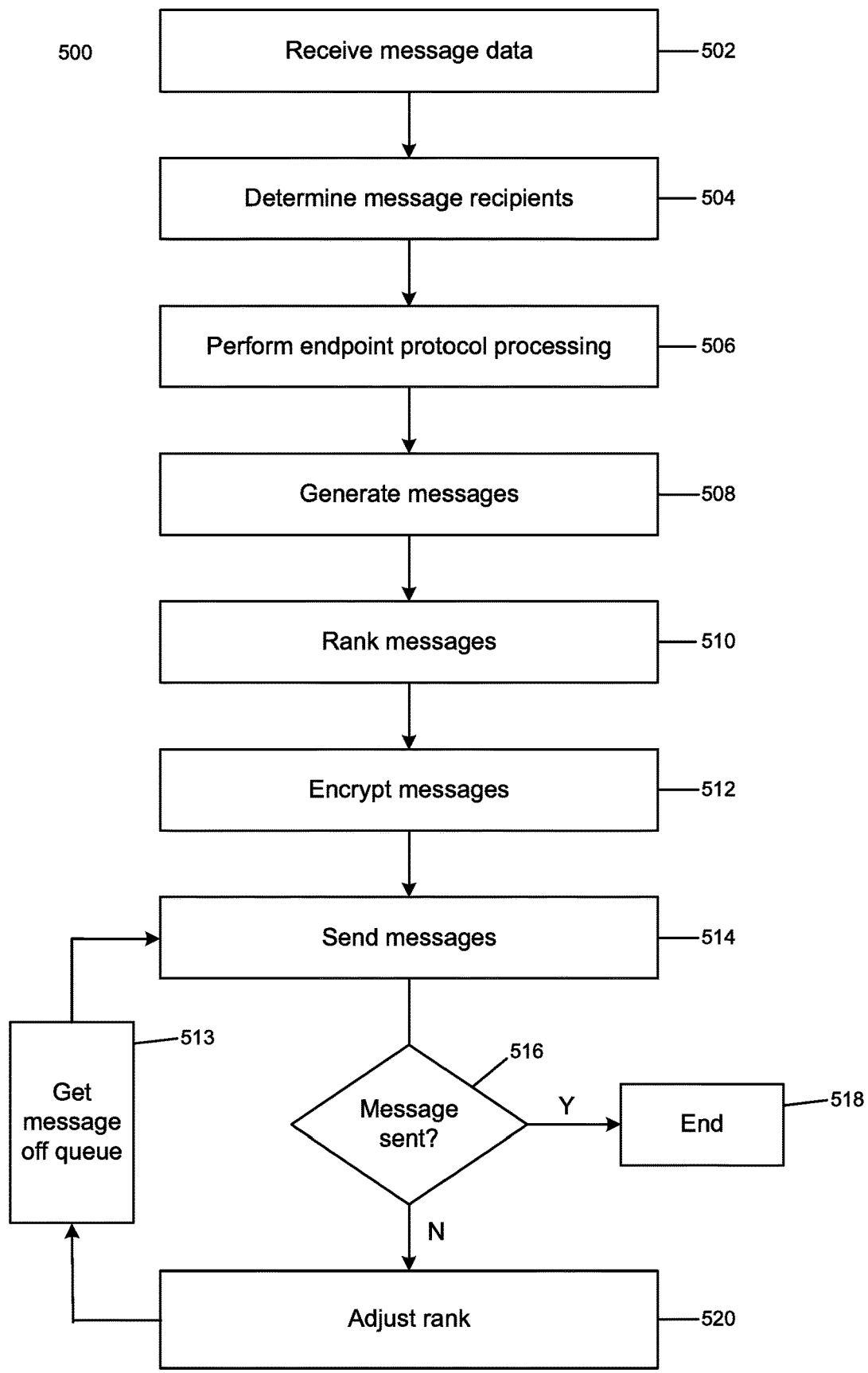
FIG. 4 is a process for queuing and sending messages according to an embodiment of the invention.

In 410, messaging server 100 may rank the messages in some embodiments (e.g., 15a of FIG. 1), for example by performing step 510 of FIG. 4 or similar processing.

In 412, messaging server 100 may encrypt the messages (e.g., 11a of FIG. 1) in some embodiments. Encryption is described in greater detail below with respect to FIG. 6.

In 414, messaging server 100 may send the messages using the appropriate endpoint protocols (see, e.g., 6, 15, and 16 of FIG. 1). In some cases, messaging server 100 may send the message directly through the internet 10 to the device 150 (e.g., for browser or app notifications). In other cases, messaging server 100 may use a third party messaging system 160 (e.g., for SMS or pager notifications), or a VOIP private network.

The messaging server 100 may provide a messaging queue. Records may enter the queue on user send, after which a few things may happen. Group messages may be broken up into multiple, single messages. Message priority may be evaluated, and records may be rearranged in the queue in the order defined by the business logic that informs the queue. User app presence may be evaluated (e.g., Online, Away, Do Not Disturb, Offline). User notification preferences may be evaluated. Message notification may be sent to the user's device. Messages may be polled for read status. Message notification may be repeated for unread messages. Message escalation may kick in for unread messages.

Figure 3:
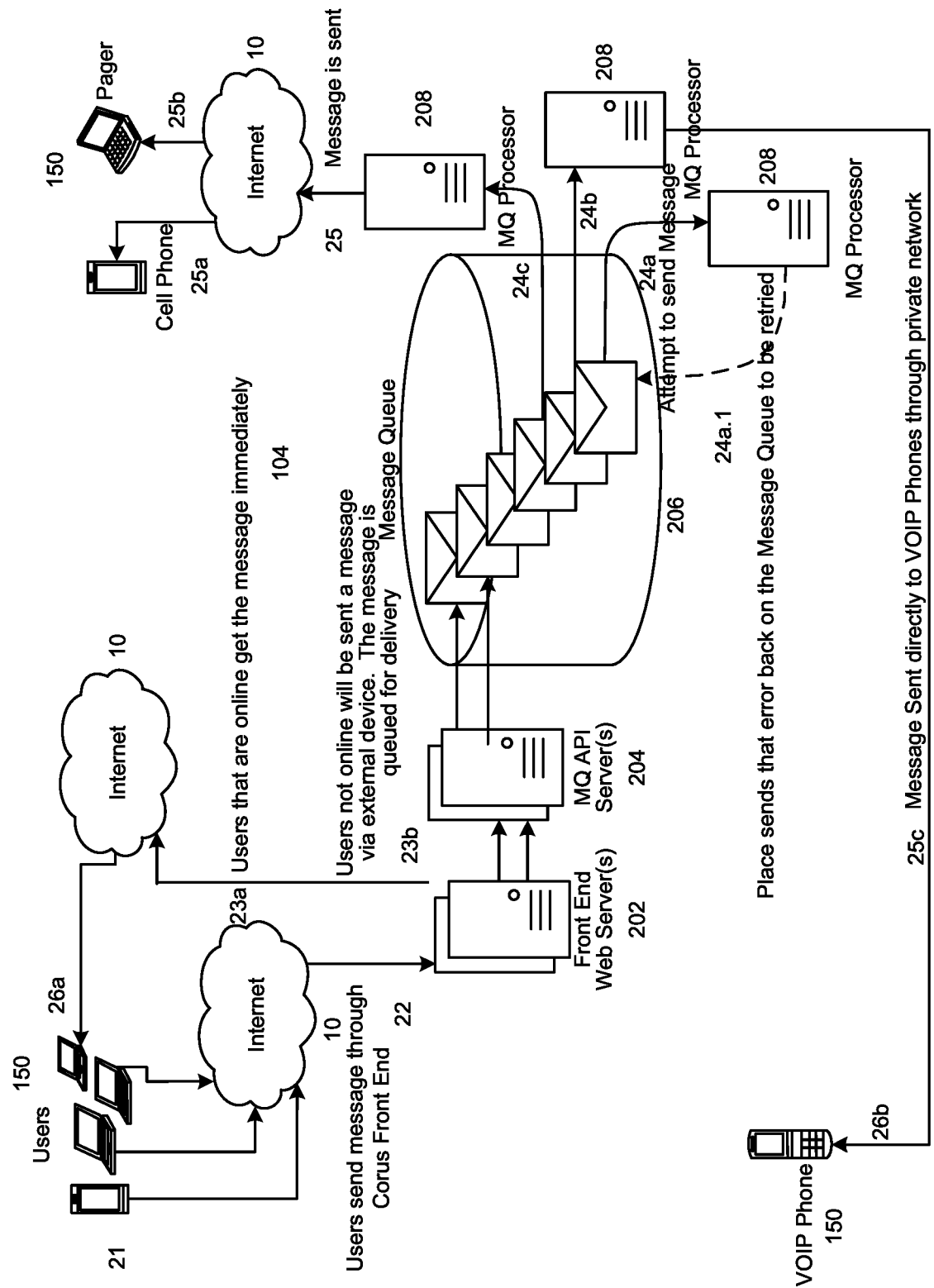
FIG. 3 is a message queue server according to an embodiment of the invention.

FIG. 3 is a message queue server 104 according to an embodiment of the invention. The message queue server 104 may be a component of the messaging server 100 in some embodiments. The message queue server 104 may include one or more front end servers 202 for receiving messages, one or more application programming interface (API) servers 204 for queueing messages, one or more queue databases 206 for storing a message queue, and/or one or more message queue processors 208 for sending messages from the queue.

In some embodiments, the following process may be used for sending messages. The message server 100 (for example, using the message queue server 104) can always send messages to the users primary device. The messaging server queue can monitor for any unread messages in N time increments with N number of repeat notifications which can be configurable through the admin interface and can send out a notification that a message has been unread. The final notification can be escalated to a secondary device type when present. If not, the default can be an email notification. The following may be used for such a process:

```
main queue loop forever {
    retrieve next item off of the queue {
        sendgMessageToPrimaryDevice( )
        createQueueItemInUnreadMessageRoomSentToUser( );
    in the GUI:
        when views room (to read messages)
            remove all messages off the unread MessageRoomQueue for
            the current user and room
    unread queue loops unreadMessageRoomQueue forever {
        retrieve next unread room off queue {
            queueItem.unreadSentCount += 1
            if (queueItem.unreadSentCount < max)
```

```
            sendUnreadMessageToPrimaryDevice(queueItem)
          else {
            sendUnreadMessageToSecondaryDevice(queueItem)
            removeItemFromUnreadQueue(queueItem)
          }
        }
      }
    }
```

In some embodiments, the following process may be used for sending messages. The messaging server 100 (e.g., using the message queue server 104) may queue messages according to one or more criteria and send messages in the queued order. The messaging server 100 may optimize message transmission through prioritization of individual items, prioritization of message types, and prioritization of available downstream applications, for example. Re-attempts at failed message sends may be handled quickly, and service redundancy may provide additional assurance of timely message delivery. To illustrate this feature, consider what might happen if a message was broadcast to 1,000 recipients simultaneously. In a hospital environment, the following message notification distribution may be made to various endpoints: 40% to pagers, 25% to smartphones, 15% to SMS, 10% to VOIP, and 10% to web-browser. An outage with a pager carrier may therefore cause 40% loss in message delivery unless messages to pagers can be redistributed. The messaging server 100 may allow the system administrator to define what might happen; for example to pause all pager notification, allowing the remainder of the traffic to flow through; to retry notification over a certain time period to allow the third-party network to recover; or to redirect notification to other known endpoints for the recipient. The following service may be used to redirect notifications, for example.

```
              loop forever {
                retrieve next item off of the queue {
                  queueItem.incrementTryCount( )
                  case (queItem.getCurrentSendType( )) {
                when 'UsaMobility': status = trySendingViaWCTP( );
                when 'twilio' : status = trySendingViaTwilio();
                when '2SMS' : status = trySendingVia2SMS();
                    when 'ASCOM' : status = trySendingVia0AP( );
                    etc. . .
                  }
                  if (status == failed) {
              if (queueItem.getTryCount( ) >= maximumAttempts) {
              /*
              we have exhausted all our tries on the current device type,
              try the next type of the device if
              the user has one
              */
                      nextDeviceToTry =
              queueItem. s endToUser.nextDeviceAfterTrying
              (queuItem.currentS endType);
              if (nextDeviceToTry != nothing) {
              /*
              user has another device to try. . . go ahead and attempt
              to send to it
              */
                          queueItem.
                          setCurrentType(nextDeviceToTry);
                          queueItem.setTryCount(0);
                          queueItem.placeBackOnQueue( );
                        }
                        else {
                          Notify Administrators of system of failure
                        }
                      else {
                        //
                        // Attempt to send to the current device again
```
```
                        //
                        queueItem.placeBackOnQueue( );
                      }
                    }
                  }
                }
```

FIG. 4 is a process 500 for queuing and sending messages according to an embodiment of the invention. In 502, messaging server 100 may receive message data from a user device 150 (e.g., 22 of FIG. 3). In some cases, messaging server 100 may authorize the sender to verify that the sender is allowed to send messages using the messaging server (e.g., using authorization server 106 of FIG. 1).

In 504, messaging server 100 may determine the recipients of the message. In some cases, recipients may be specified by the user of the device 150 and contained in the message data. In other embodiments, recipients may be identified based on patient information contained in the message, search information contained in the message, or other data, as described in greater detail below.

In 506, messaging server 100 may perform endpoint processing in some embodiments, for example by performing steps 406 and 408 of FIG. 2 or similar processing.

In 508, messaging server 100 may generate a message for each selected transmission. The messages may be formatted according to selected endpoint protocols in some embodiments. For example, a pager may receive a wireless communication transfer protocol or a simple network paging protocol message, while a cell phone may receive an SMS or MMS message.

In 510, messaging server 100 may rank the messages and place them in the queue 206 in the order in which they are ranked. For example, certain recipients may be ranked higher than others, and, for individual recipients, certain devices and/or message types may be ranked higher than others. Ranking may be specified by the message sender and/or determined automatically. Once a message reaches the messaging queue, the messaging queue logic of the messaging server 100 may decide what action to take next. The messaging server 100 may look up the user's individual preferences with regard to mobile endpoint notification and prepare the message for transmission to a preferred device. When a secure connection exists between the messaging server 100 and the mobile endpoint, the message payload may be sent along with the notification event. When a secure connection does not exist (e.g., when sending via SMS to a user's cell phone), the messaging server 100 may instead send a message to the user's cell phone with a Uniform Resource Locator (URL) to retrieve the message within a web browser. This transmission option may ensure HIPAA compliance for unsecured connections, as the URL may be secure.

In 512, messaging server 100 may encrypt the messages (e.g., 11*a* of FIG. 1) in some embodiments. Encryption is described in greater detail below with respect to FIG. 6.

In 514, messaging server 100 may attempt to send the messages using the appropriate endpoint protocols (see, e.g., 24 and 25 of FIG. 3). In some cases, messaging server 100 may send the message directly through the internet 10 to the device 150 (e.g., for browser or app notifications). In other cases, messaging server 100 may use a third party messaging system 160 (e.g., for SMS or pager notifications), or a VOIP private network (e.g., 25*c* of FIG. 3).

In 516, messaging server 100 may determine whether a message was successfully sent. If all messages are successfully sent, the process 500 may end in 518. If not, message ranks may be adjusted, and the messages may be retrieved from the queue, in 520 and 513, respectively. Messages retrieved from the queue may be resent in 514. For example, if an error is generated in transmission (e.g., a connection times out, an error is received from the network or receiving device, etc., see 24.*a*.1 of FIG. 3), the erroneous message may be replaced at the top of the queue, or a next preferred device for the recipient may be selected and placed at the top of the queue, or a next preferred recipient of the message may be selected and placed at the top of the queue, etc. An example of endpoint-specific messaging is also included in the above-described service used to redirect notifications.

The messaging server 100, and the messaging it provides, may work as a companion to electronic medical records (EMR). Leveraging web services available from EMR vendors and through the orchestration of data into fast healthcare interoperability resources (FHIR)-based objects, communications in the patient context may be implemented through dynamically generated objects such as channels that are uniquely named utilizing information such as the patient name, MRN, unit, bed, or a combination of any or all of the identifying information. From these, the messaging server 100 may build patient objects (such as but not limited to channels) around which providers may coordinate care, join existing threads, or alert the treatment team to a critical result or finding. For example, in reviewing a patient's case, a radiologist may discover a life-threatening condition. The radiologist may be unaware of who the patient's attending physician or unit nurse is, but she has the patient's name and medical record number at her disposal. By entering the patient's MRN, the radiologist may quickly notify the patient's entire treatment team, perhaps saving his life.

Figure 5:
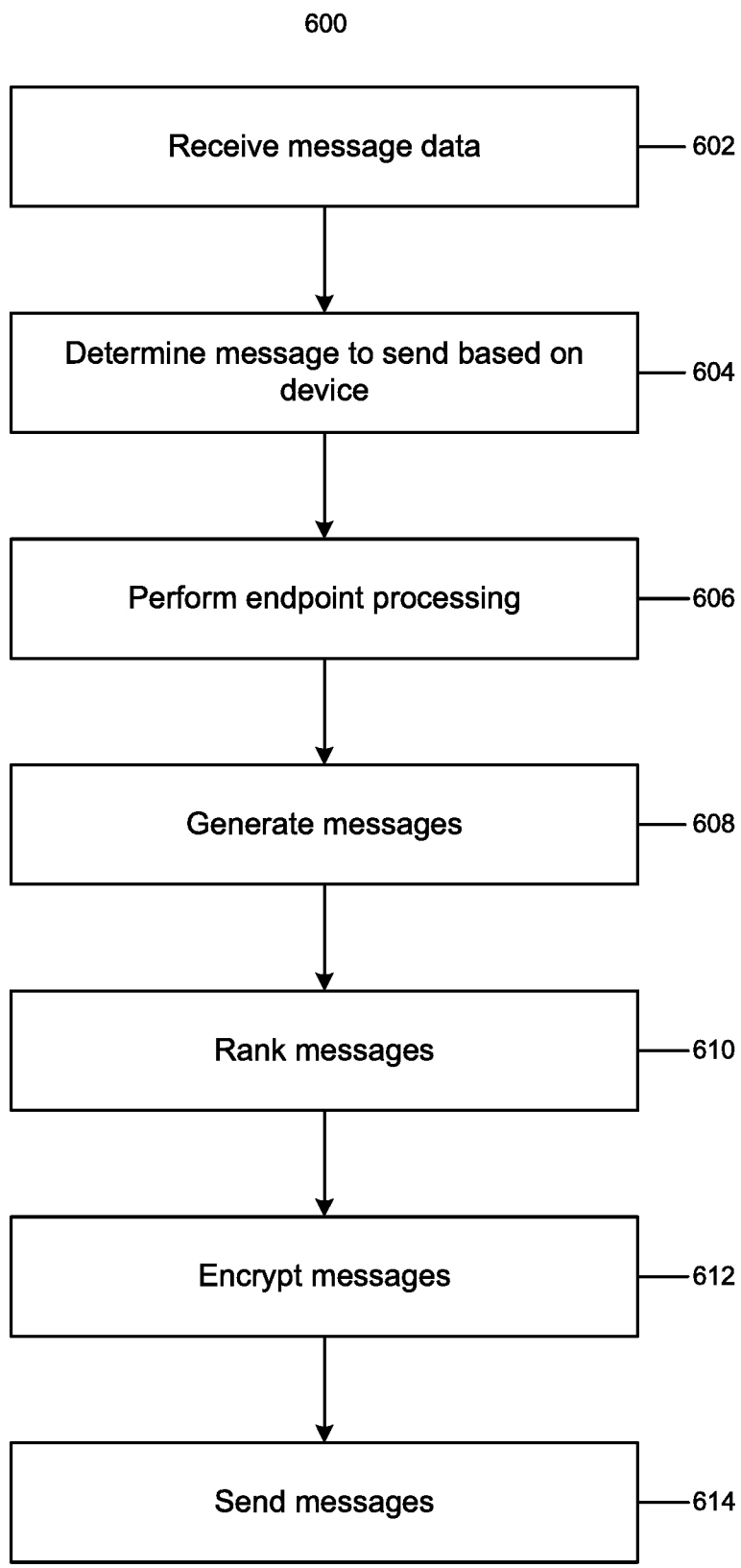
FIG. 5 is a process for determining message recipients according to an embodiment of the invention.

FIG. 5 is a process 600 for determining message recipients according to an embodiment of the invention. For example, this process 600 may identify the appropriate channels for messages based on patient identifying information in a message. In 602, messaging server 100 may receive message data from a user device 150 (e.g., 12 and 13 of FIG. 1). In some cases, messaging server 100 may authorize the sender to verify that the sender is allowed to send messages using the messaging server (e.g., using authorization server 106 of FIG. 1).

In 604, messaging server 100 may determine which messages are to be sent to which recipients based on device. In some embodiments, messaging server 100 may analyze the message data to locate patient identifying information. For example, patient name, MRN, unit, bed, etc. may be present in the message and may be linked to one or more medical records to which messaging server 100 has access. Certain devices 150 may be authorized for receiving messages related to the patient. For example, one or more doctors' devices 150 may be listed in the one or more medical records to which messaging server 100 has access that were identified using the patient identifying information.

In 606, messaging server 100 may perform endpoint processing in some embodiments, for example by performing steps 406 and 408 of FIG. 2 or similar processing.

In 608, messaging server 100 may generate a message for each selected transmission. The messages may be formatted according to selected endpoint protocols in some embodiments. For example, a pager may receive a wireless communication transfer protocol or a simple network paging protocol message, while a cell phone may receive an SMS or MMS message.

In 610, messaging server 100 may rank the messages in some embodiments, for example by performing step 510 of FIG. 4 or similar processing.

In 612, messaging server 100 may encrypt the messages (e.g., 11*a* of FIG. 1) in some embodiments. Encryption is described in greater detail below with respect to FIG. 6.

In 614, messaging server 100 may send the messages using the appropriate endpoint protocols (see, e.g., 6, 15, and 16 of FIG. 1). In some cases, messaging server 100 may send the message directly through the internet 10 to the device 150 (e.g., for browser or app notifications). In other cases, messaging server 100 may use a third party messaging system 160 (e.g., for SMS or pager notifications), or a VOIP private network.

The messaging server 100 may provide communication security, for example to support HIPAA compliant messaging between two or more people. Encryption key management may be provided through Gemalto's SafeNet KeySecure™ and/or other encryption key management solutions (e.g., key storage 122 of FIG. 1) to authorize access to communications transmitted by the messaging server 100. The following service may be used to import patient information from FHIR, for example.

```
void patientImport( )
    patientImportData = RetreiveUserData(getPatientDataUrl( ));
    while (hasMoreRecords(patientImportData )) {
        patientRecord = getNextRecord(patientImportData);
        patient = patientRecord.getPatient( );
        upsertUserData(patient);
        careTeam = patientRecord.getCareTeam( );
        changesWereMade = updatePatientCareTeam(patient,careTeam);
        //
    // if the team changed and the patient has an existing channel, then
    update its members
        //
        if (changesWereMade && channelExistsForPatient(patient)) {
            updateMembersOfChannel(getPatientChannel(patient),
                careTeam);
        }
    }
}
```

The following service may be used to open a channel related to a patient for sending messages to users interested in the patient, for example.

```
/*
UI would call this method to get the channel for the patient.
After retrieving the channel, the
GUI would navigate to it
*/
channelID getPatientChannel(patientID) {
    channelID = getChannelForPatient( );
    if (channelID == null) {
        channelID = createChannelForPatient(patientID,
            getCareTeam(pateintID( ))

}
    return channelID
}
```

Figure 6:
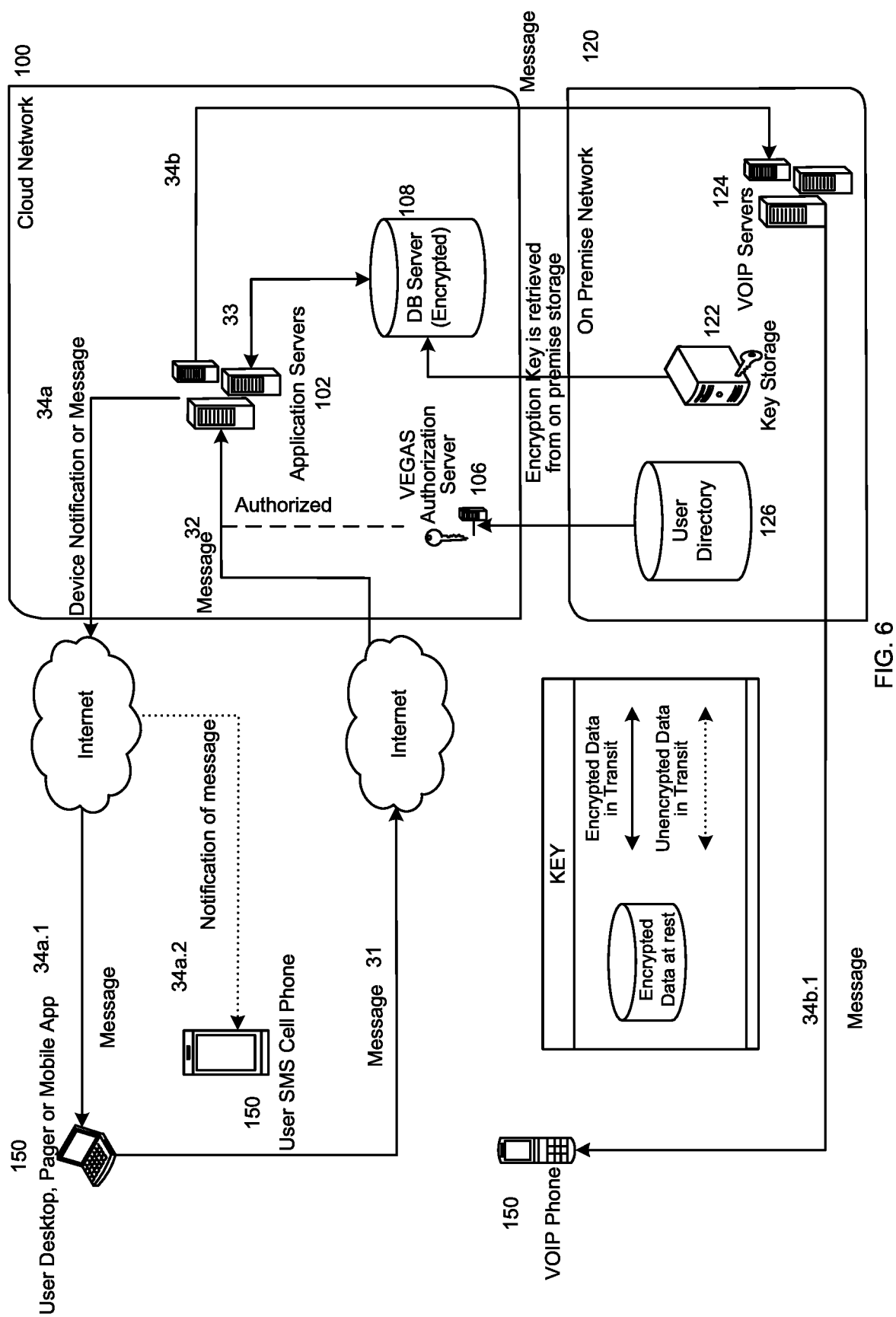
FIG. 6 is a security system according to an embodiment of the invention.

FIG. 6 is a security system according to an embodiment of the invention. Specific components of the security system may include, for example, authorization server 106, user directory 126, and/or key storage 122. Authorization server 106 may be integrated into and/or located with messaging server 100 in some embodiments, as shown. However, user directory 126 and key storage 122 may be housed in the on premise network 120 and may be separate from messaging server 100 to provide security for the user information and keys stored therein, respectively. Authorization server 106 may dynamically define user groups based on user attributes that may be populated from user directory 126 or some other source directory. User groups may define who can access messaging server 100, who can populate channels (e.g., a radiology channel may be restricted to access by radiology group members only as defined in user directory 126; this group may be created by authorization server 106), who can communicate with whom, etc.

Figure 7:
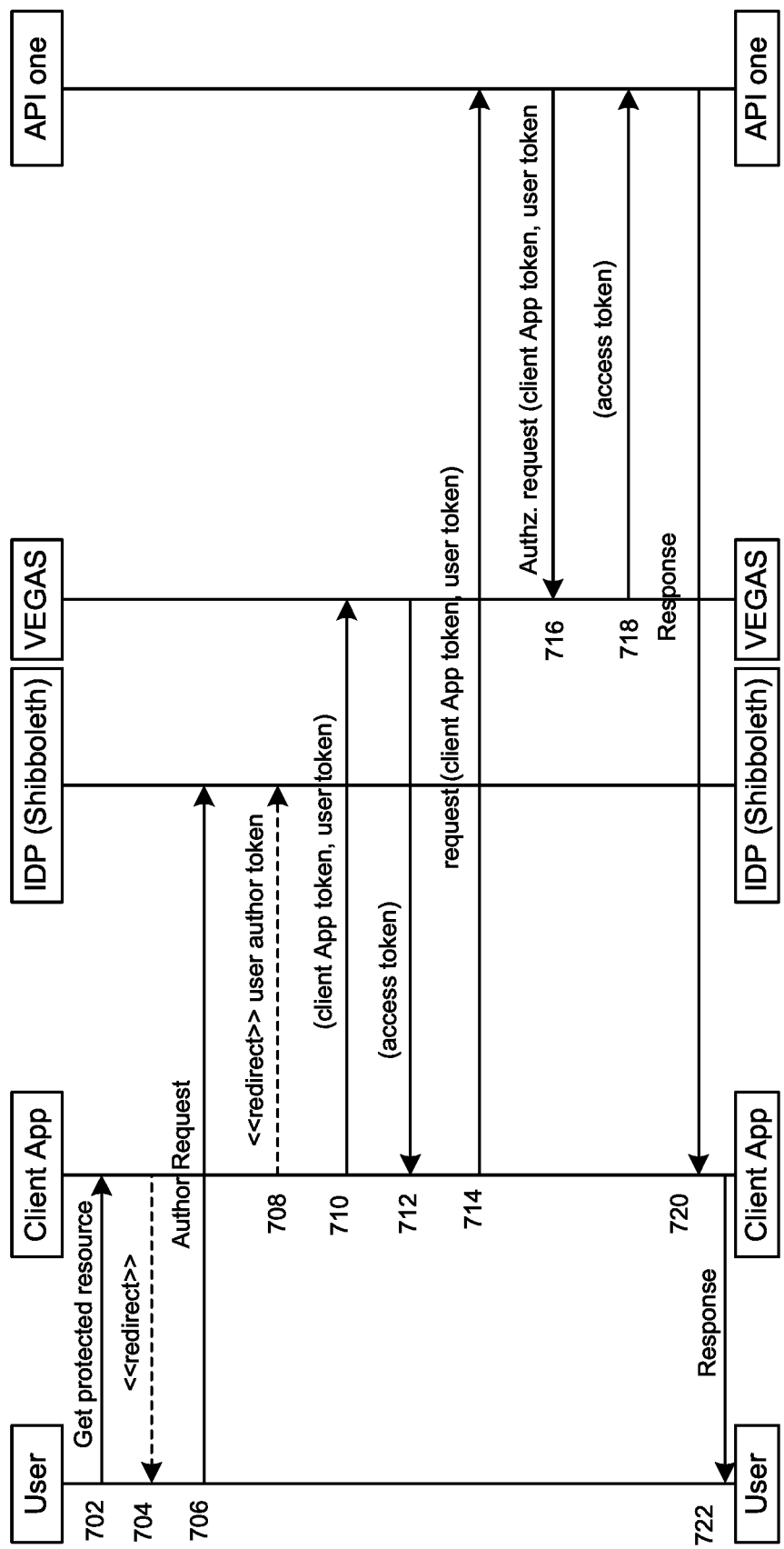
FIG. 7 is an authentication process according to an embodiment of the invention.

FIG. 7 is an authentication process 700 according to an embodiment of the invention. Authorization server 106 (VEGAS (Virtual Enterprise Group Authorization Service)) may provide lightweight IAM (Identity and Access Management) features such as the following:
1. Authorization Service (authZ)
2. Authentication Service (authN)—VEGAS may provide Open Authentication 2 (oAuth2) services that proxy authN requests to configured SAML IdP and convert it to an oAuth2 access token (an oAuth2 framework can enable applications to obtain limited access to user account on an HTTP service)
3. Policy Administration Point (PAP)—Point which may manage access authorization policies (VEGAS Admin)
4. Policy Decision Point (PDP)—Point which may evaluate access requests against authorization policies before issuing access decisions (VEGAS Authorization)
5. Virtual Directory
   Aggregates attribute data from multiple endpoints
   Queries the aggregated data to calculate dynamic group membership
   Provides:
      Role based access control (RBAC)
      Attribute based access control (ABAC)
      VEGAS may provide a standardized way to integrate with a multitude of other directory sources and protocols such as: LDAP (Lightweight Directory Access Protocol), SAML (Security Assertion Markup Language), RDMS (Relational Database Management System).

The sequence 700 of FIG. 7 is one example of how authorization server 106 may provide authorization for a user interacting with messaging server 100 using a client app. In 702, user may request a protected resource. In 704, client app may request redirect authorization, and in 706 the request may be transmitted to an Identity Provider (IdP). In 708, client device may send user author token to IdP. In 710, client device may send client app token and user token to authorization server 106. In 712, authorization server 106 may return access token to client device. In 714, client device may use authorized access token to request access from API (e.g., messaging server 100). In 716, messaging server 100 may request authorization from authorization server 106. In 718, messaging server may respond with authorized access token. As a result, in 720, messaging server 100 may send a response to client device, and in 722, client device may display successful connection to user. From this point, the user may interact with messaging server 100 to perform any of the above-described actions.

FIGS. 8-14 are user interface 800-1400 screenshots according to an embodiment of the invention. The messaging server 100 may provide one or more user interfaces, such as a web user interface. The web user interface is provided herein as an example, but other interfaces such as mobile web interfaces and dedicated app interfaces may provide similar functionality.

Figure 8:
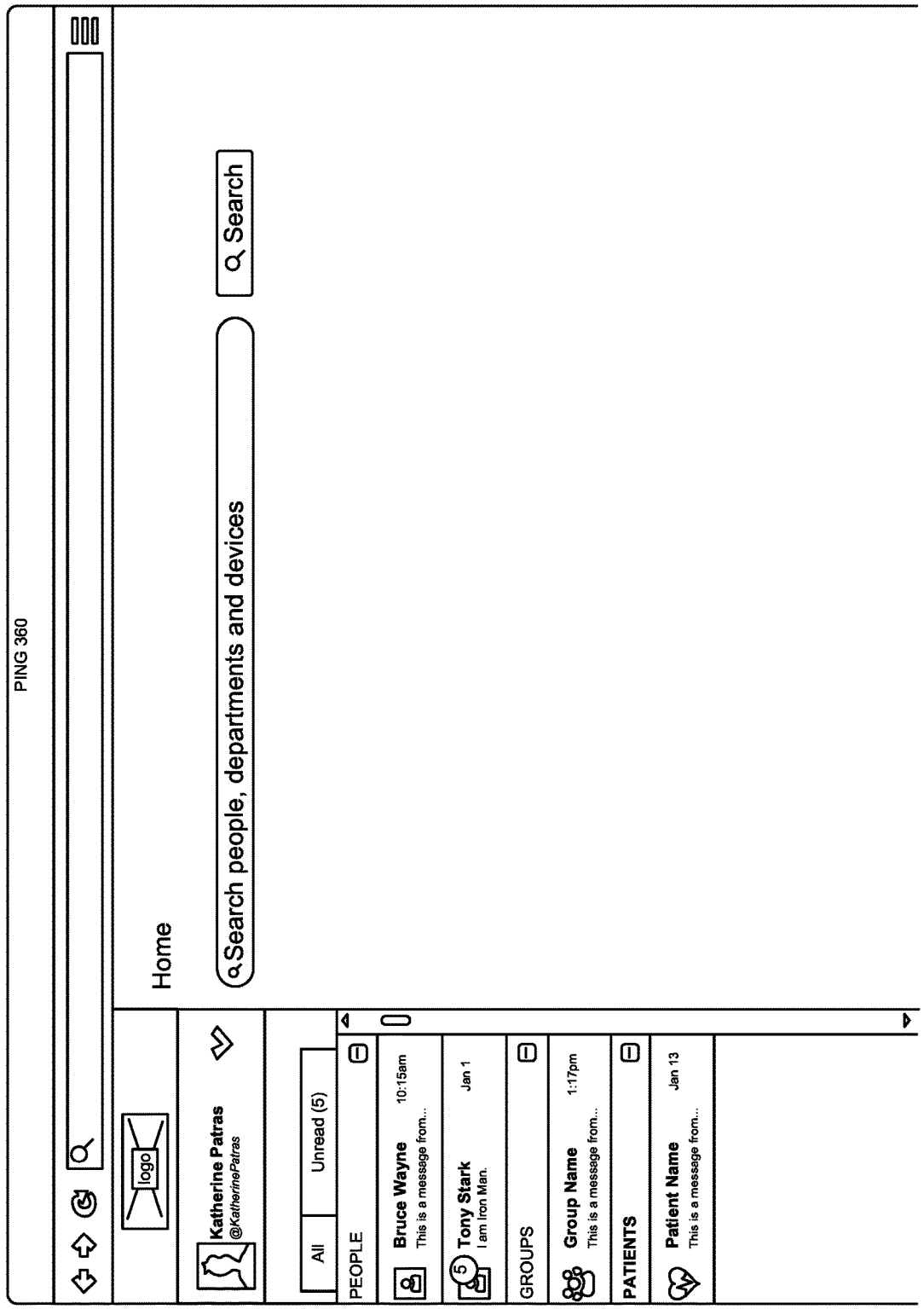
Figure 9:
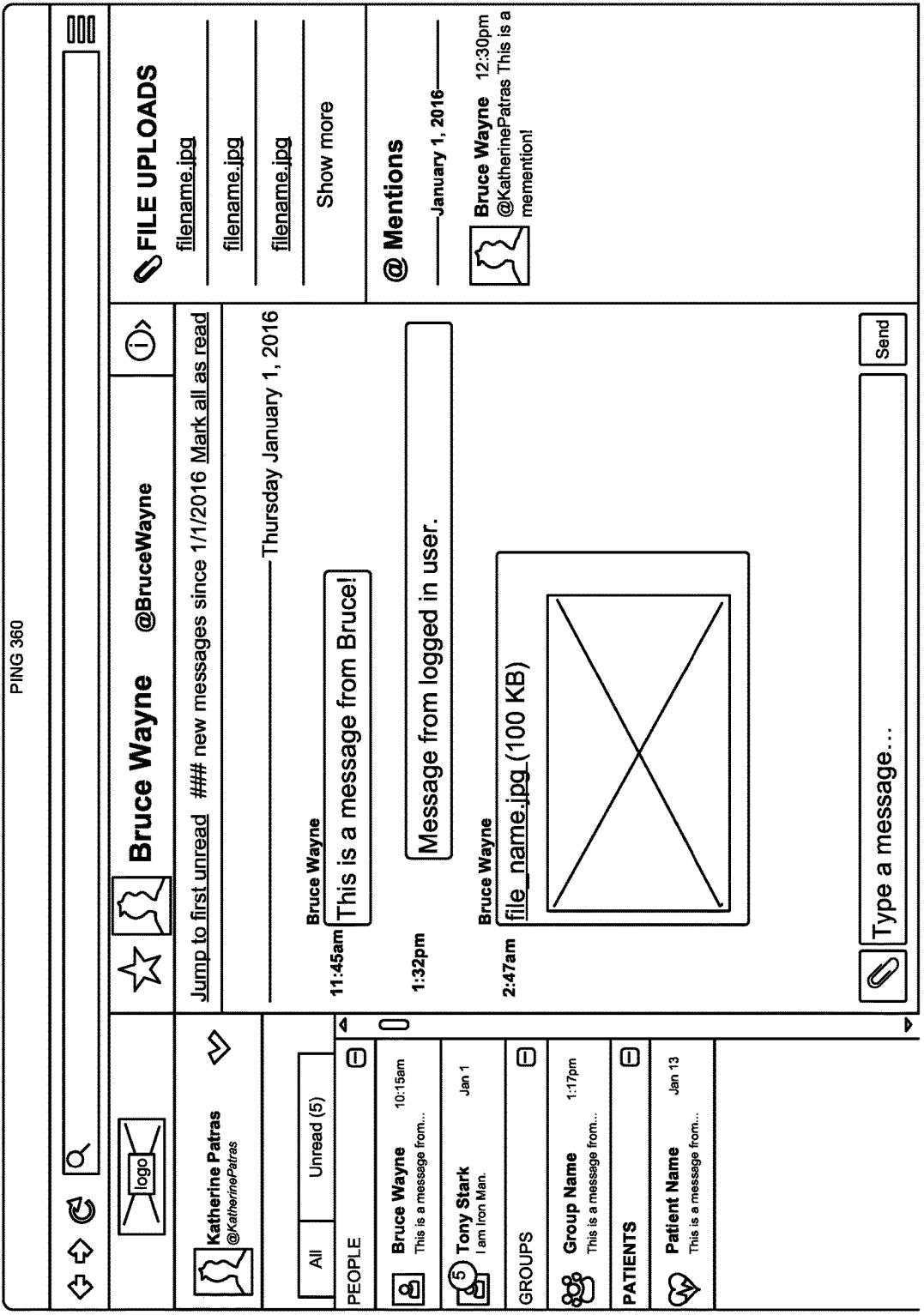
Figure 10:
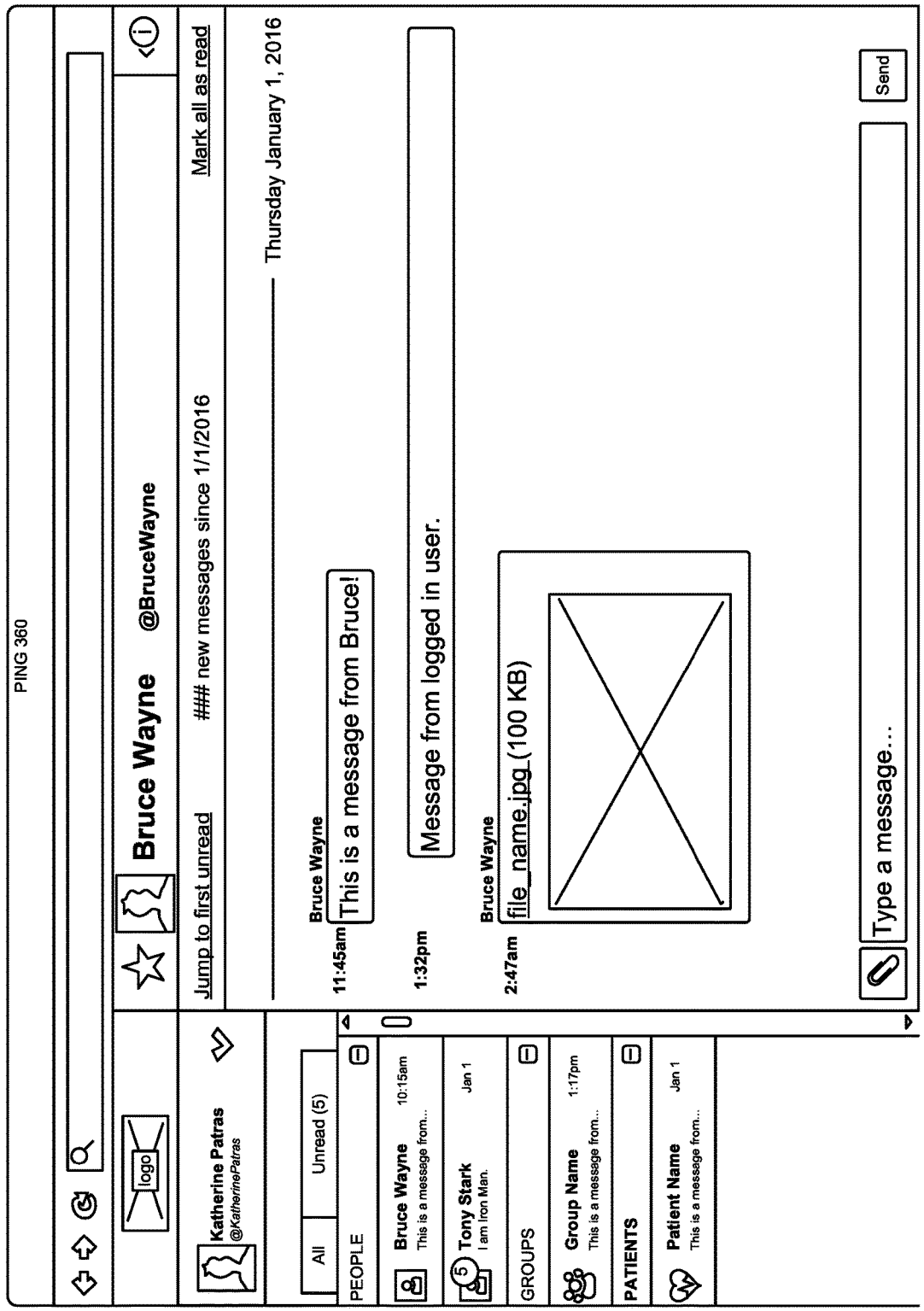
Figure 11:
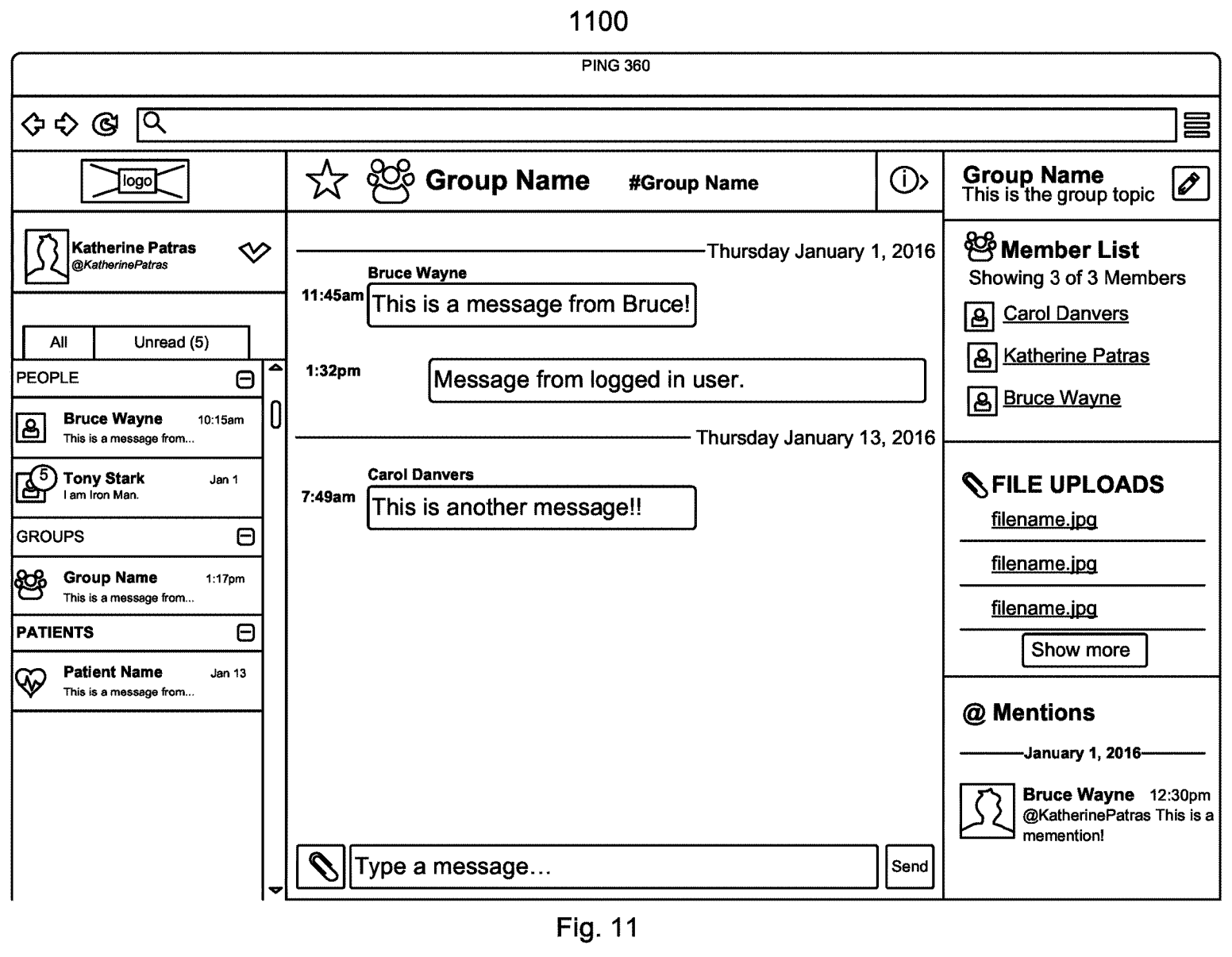
Figure 12:
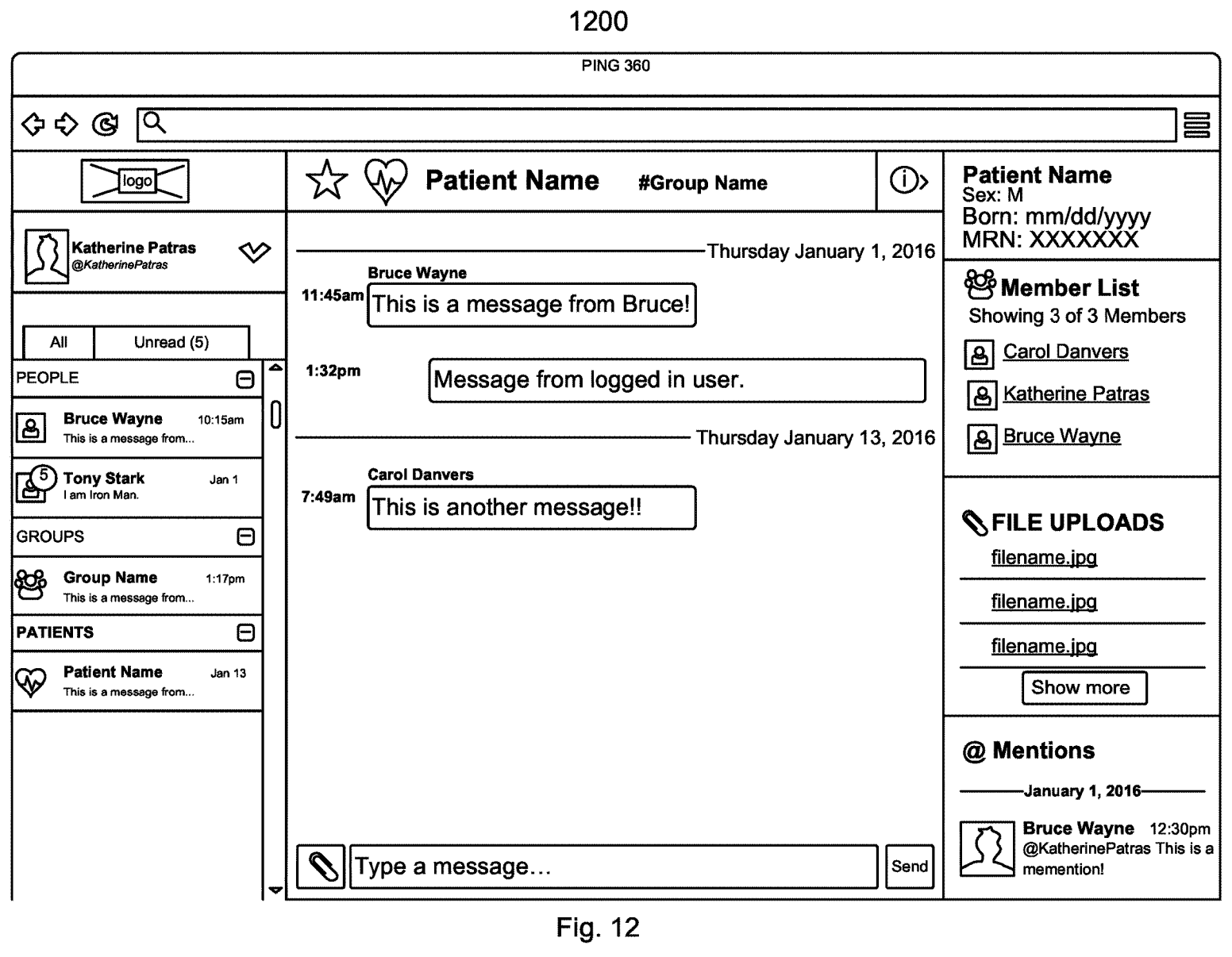

FIG. 8 is a home interface 800. The interface 800 may include a search function and a listing of messages, groups, and patients. FIGS. 9-12 are messaging user interfaces. Specifically, FIG. 9 shows a direct message interface 900 for point to point messaging between users. FIG. 10 shown another direct message interface 1000 with extraneous information collapsed. FIG. 11 shows a group message interface 1100 for sending messages to and receiving messages from multiple users. FIG. 12 shows a message with patient context interface 1200, wherein patient information (which may be obtained and integrated as described above) is included in the message interface 1200, and the message participants may be people associated with the patient.

Figure 13:
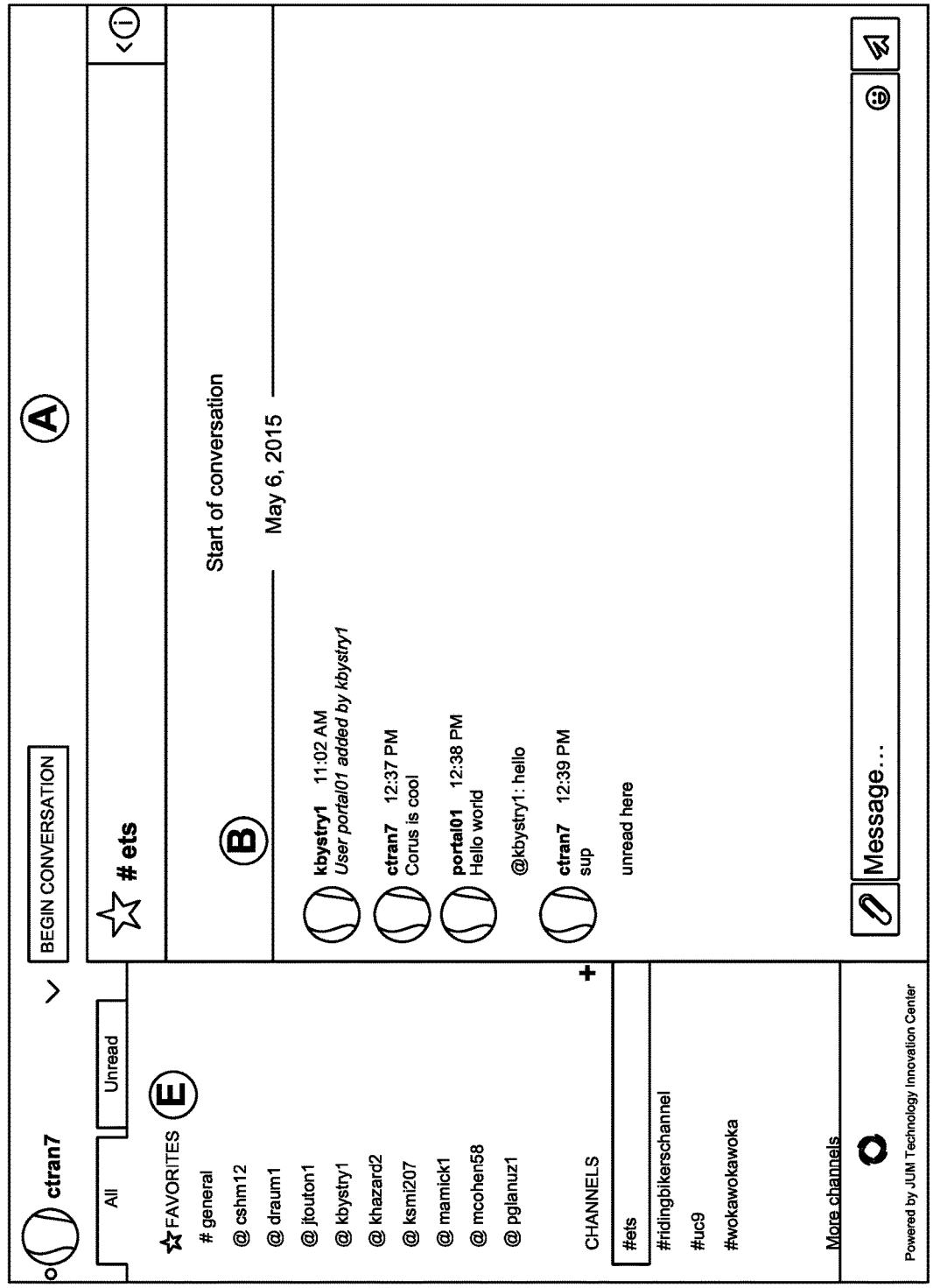

FIGS. 13 and 14 show a conversation interface 1300 and search interface 1400, respectively The web user interface may include a search feature, user controls, message controls, message threads, and filters for unread messages. Administrators may control home page content, place site-wide alerts, lock the site for maintenance, generate message reports, create and remove groups, update group memberships, and administer user metadata (see element A, for example). Message screens may feature controls that enable the sharing of text, links, and files; the ability to invite other users to the conversation thread; and the ability to trigger mobile notification to one or more of the users in the conversation (see element B, for example).

The web user interface may provide an intuitive user profile, designed to give the user control over his or her in-application presence, desktop and mobile preferences, contact information, and directory entry. Users may be authenticated and authorized for access to a user directory layer wherein user roles may be defined, applied, and, at time of authentication, evaluated. The user may control the visibility of attribute(s) displayed within the application, his or her notification preferences based on device, role or time of day, and his or her individual forwarding options—all of which may work together to ensure reliable notification of unseen and important messages to the right device at the right time.

The web user interface may provide search by user name, user Identification (ID), contact number, group name, group ID, patient name, medical record number (MRN), or other criteria (see element C, for example). Object metadata may inform searches, filtering results as the user types (see element D, for example). Once the user identifies the correct result, the result may be flagged as a favorite, enabling 1-click access in the future (see element E, for example).

Figure 15:
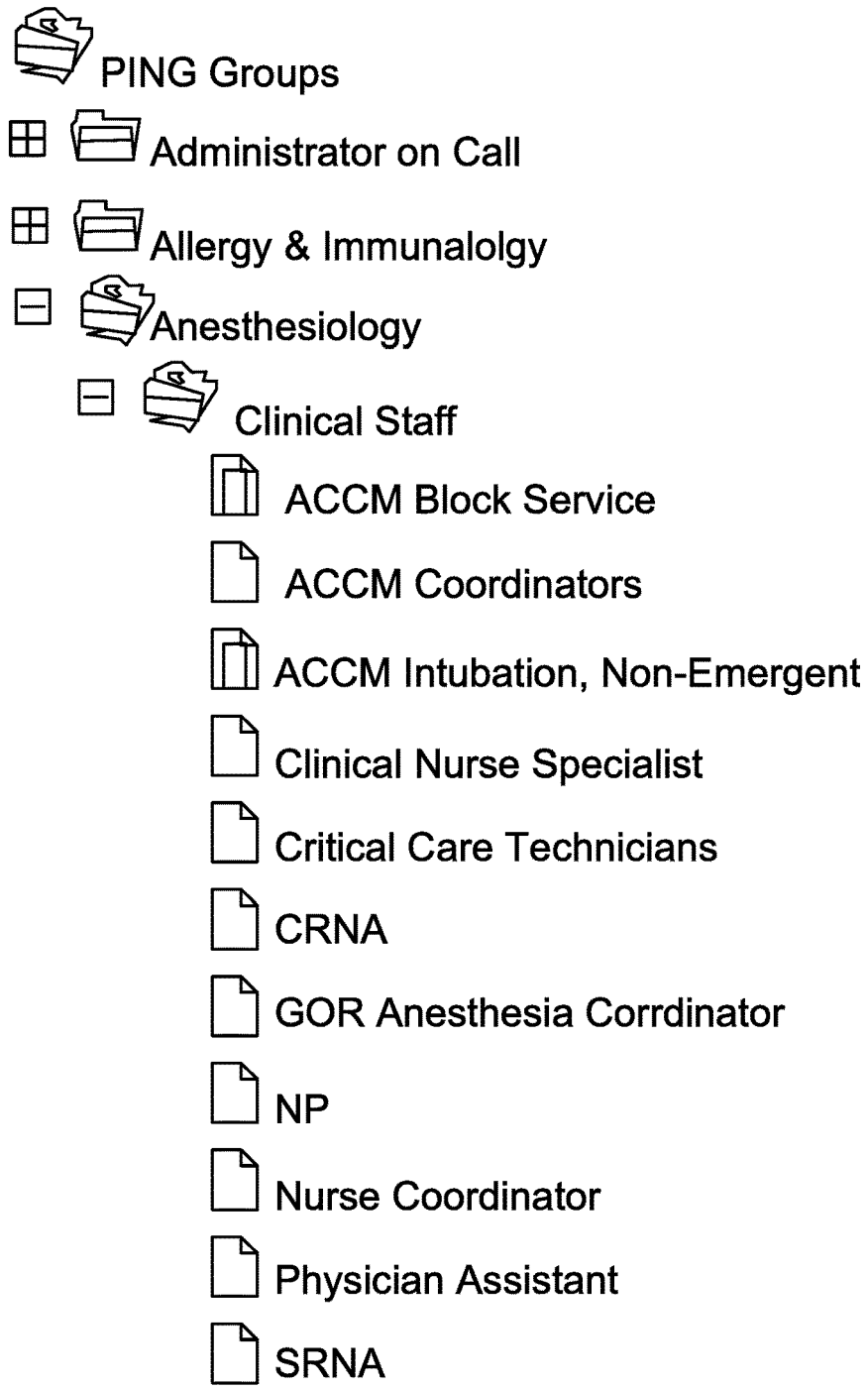
FIG. 15 is a user group according to an embodiment of the invention.

FIG. 15 is a user group 1500 according to an embodiment of the invention. Searching for users, devices, and groups to message may be performed via various key fields such as name and title but may also include the ability to search via tags. Each messagable endpoint may be assigned any number of tags allowing users to filter or weight the search results higher for endpoints that contain these tags. This may alleviate any need to store hierarchical information, as this type of information may be stored using tags. For example, a user may belong to a group named "ACCM Coordinators" within an organization as shown in the group 1500 of FIG. 15. The tags stored on the user may be: "PING Groups", "Anesthesiology", "Clinical Staff", and "ACCM Coordinators". When an end user the performs a search with the tag "ACCM Coordinators," messaging system 100 may weight all users who have that tag to the top. If there happens to be more than one "ACCM Coordinators" in the organization, simply providing another tag such as "Anesthesiology" in the search may further narrow down the results.

The tags may be supplied via a user import from the client, allowing full customization for each organization using the messaging system 100.

The following service may be used to import tags, for example.

```
void userImport( ) {
    userImportData = RetreiveUserData(getUserDataUrl( ));
    while (hasMoreRecords(userImportData)) {
        userRecord = getNextRecord(userImportData);
        name = userRecord.Name;
        title = userRecord.title;
        upsertUserData(userRecord. uid,
            userRecord.name,
            userRecord.title,
            userRecord.active,
            userRecord.orgUnitDn,
            userRecord.orgDn,
            userRecord.messagingDevices,
            userRecord.tags,
            userRecord.phone,
            userRecord.type);
    }
    summarizeUserTagData( )
}
void summarizeUserTagData( ) {
    executeQueryCINTSERT INTO UserTagSummary
        SELECT tags, count(*) as [weight]
        FROM users
        GROUP BY tags
        ORDER BY COUNT(*)");
}
```

The following service may be used to retrieve a list of tags to suggest to the user to pick from based upon tags that were already entered by the user.

```
TagResults getTagSuggestions(existingTags) {
    return executeQuery("SELECT TOP 10 tags
        FROM UserTagSummary
        WHERE tags contain %existingTags%
        ORDER by weight DESC")
}
```

The following service may return search results based upon search criteria entered.

```
SearchResults search(String searchField, String searchTags) {
    people = executeQuery("SELECT name, title, tags
        FROM users
        WHERE tags like %searchTags%
        AND name like %searchField% or title like %searchField%")
    groups = executeQuery("SELECT name, title, tags
        FROM groups
        WHERE tags like %searchTags%
        AND name like %searchField% or title like %searchField%")
    return unionResultsOrderBySearchCriteriaMatchWeight
        (people,groups)
}
```

In some embodiments, the disclosed systems and methods may provide one or more of the following features:

A tag-based search mechanism may offer filter suggestions as a user types within a user interface. This may allow the user to drill down into units, patients, specialties, services, and more, which may make it far easier and far faster to find the correct result. In a clinical setting, when seconds count, this really matters. Density and dynamic group membership components may be leveraged into tag-based metadata describing result objects, allowing for a rich set of returned values, such as individuals available for direct messaging, groups available for chat, providers in a specific role, or even the care coordination that goes into a consult response The user interface may allow users to create out of office messaging, forwarding, repeat notification, and escalation, all either programmatically defined or controlled by the end user. The user interface may be provided in native apps, web sites, and/or mobile sites, for example.

A multitude of mobile endpoint types may be supported, including pagers and VOIP phones. As opposed to merely offering an outbound message to a pager or cell phone instructing the recipient to take further action within a web or desktop app, the systems and methods described herein may enable message contents to flow through to these end points while still maintaining HIPAA compliance. Bidirectional communication between disparate types of hardware may be provided.

A standards based FHIR (Fast Healthcare Interoperability Resources) developed under the Health Level Seven International (HL7) organization may be utilized. Using an object based messaging construct and standardizing on FHIR, data may be integrated from a multitude of Electronic Medical Record (EMR) vendors in a far more efficient way than a traditional HL7 implementation. This may improve efficiency over a manual process of uploading patient data in a spreadsheet format, which is not real-time, or over HL7 which is not optimized for application communication because adaptation of the standard is required at each site where it is used.

Security features may include on premise key generation and management services that may allow local administrators to manage and rotate keys as needed and may allow for scaling of key management at remote facilities or in the cloud. TDE (Transparent Data Encryption) may be used on the database, which may allow for faster application performance, may reduce key management for backups and recovery, and may streamline the application architecture while allowing scalability.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as Erasable Programmable Read-Only Memory (EPROM), Electronically Erasable Programmable Read-Only Memory (EEPROM), and flash memory devices; magnetic disks such as internal hard disks and removable disks; magneto-optical disks; and Compact Disk Read Only Memory (CD-ROM) and Digital Versatile Disk Read Only Memory (DVD-ROM) disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a Local Area Network (LAN), a Wide Area Network (WAN), and the computers and networks forming the Internet. The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 16:
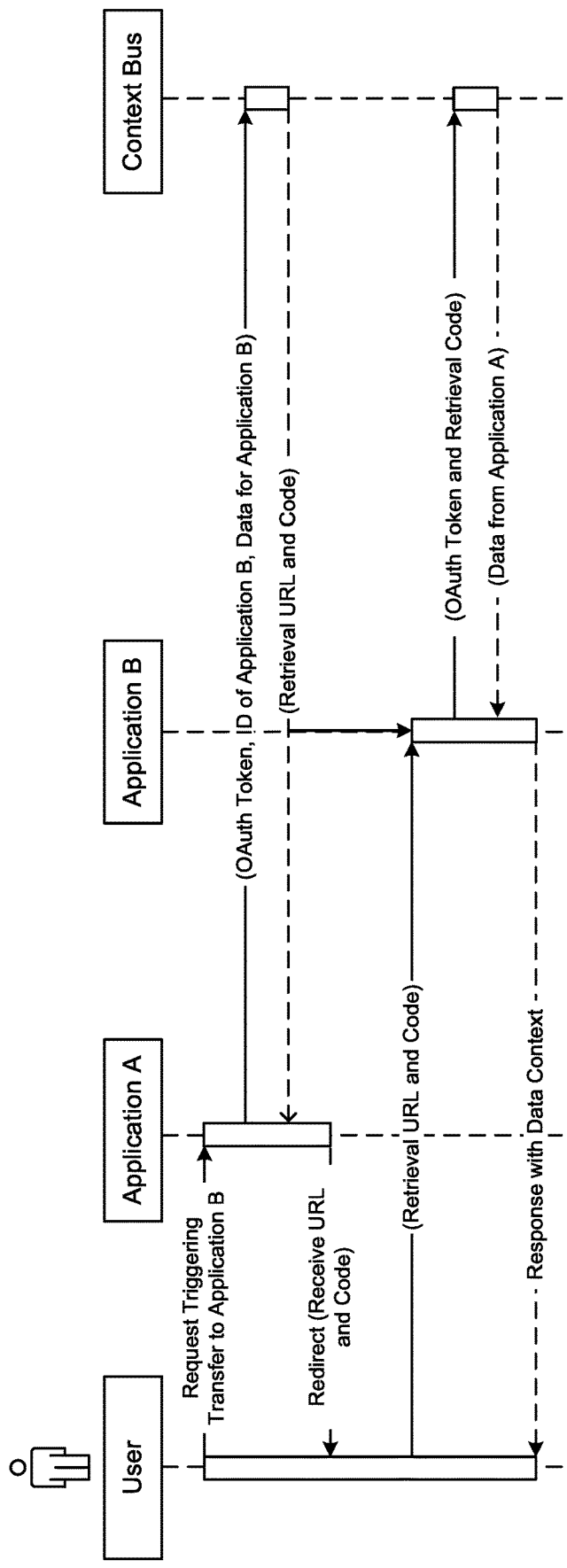
FIG. 16 illustrates a process of using a context bus, according to an embodiment of the invention.

FIG. 16 illustrates a process of using a context bus, according to an embodiment. The context bus can provide a secure means of transferring sensitive data between two applications without pre-arranged trust between the applications and with minimal configuration. The methods can protect the data from untrusted intermediaries, and/or can provide data integrity and verification of the sender and recipient identity.

Code flow may be used in scenarios where the application is able to post the data to the context bus before redirecting the user. The sending application (Application A) and the receiving application (Application B) can have established a trust with the context bus (e.g. OAuth token and/or pre-shared secret). Application A can post the data to the context bus, along with relevant information comprising: authentication token and/or key, data expiration, or recipient ID; or any combination thereof. The context bus can store the data securely and can return a URL to the context bus's data retrieval endpoint with a unique un-guessable token. Application A can redirect the user to Application B with the URL and/or the token provided by the context bus. Application B can then call a data retrieval endpoint with the retrieval code and its own authentication token and/or key. The context bus can verify Application B's identity and then returns the data packet. Application B can then be able to use the data without ever exposing the data to the user.

Example Super User Do (SUDO) code that may be used for the code flow is set forth below:

```
// Creating the Code Flow URL
exports.dropOffData = function(clientToken, data, recipientId,
expiration) { if(
    ! IsAuthorized (clientToken) ) {
      response.writeHead(401);
      response.end( );
    var senderId = GetClientId(clientToken);
    var code = Random.secret( );
    var hashedCode = Hash(code);
    var dataPackage = {
      senderId : senderId,
      recipientId : recipientId,
      when : new Date( ),
      expiration : expiration,
      hashedCode : hashedCode,
      data : data
    }
    DB.save(dataPackage)
    var url = RETREIVALURL + u?code" + code;
    return {url : url, code : code}
  };
```

Figure 17:
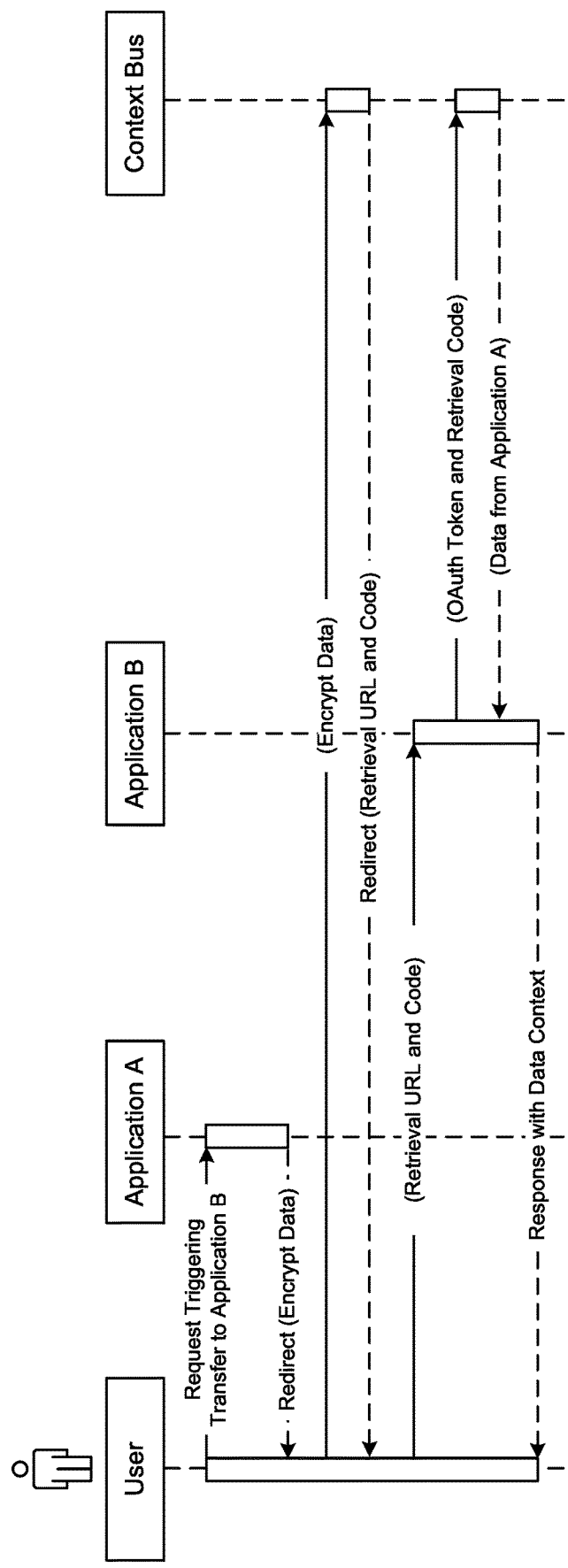
FIG. 17 illustrates use of encrypted packet flow, according to an embodiment of the invention.

FIG. 17 illustrates use of encrypted packet flow, according to an embodiment. The encrypted packet flow may be used when the sending application cannot post the information to the context bus before directing the user to Application B. The sending application (Application A) can have a pre-shared secret with the context bus and the receiving application (Application B) can have established a trust with the context bus (e.g. OAuth token or pre-shared secret). Application A can encrypt the data along with relevant information such as data expiration and recipient ID in an encrypted string. Application A can then redirect the user with the encrypted string to the context bus. The context bus can decrypt the encrypted string and store the data securely. Using the information from the encrypted packet, the context bus can redirect the user to Application B with the URL to the context bus's data retrieval endpoint with a unique un-guessable code. Application B can then call data retrieval endpoint with the retrieval code and its own authentication token and/or key. The context bus can verify Application B's identity then return the data packet.

Example SUDO code for the encryption packet flow is below:

```
// Creating the Encrypted Packet Flow
exports.packetDropOff = function(encryptedPacket, senderId) {
```

-continued

```
    var key = GetApplicationEncryptionKey(senderId);
    var packet = Decrypt(encryptedPacket, key);
    if(!packet.senderId 1 1 packet.senderId != senderId){
        response.writeHead(401);
        response.end( );
          d,f,a    pack
    var destinationURL = packet.destinationURL;
    var recipientId = packet.recipientId;
    var data = packet.data;
    var expiration = packet.expiration;
    var code = Random.secret( );
    //*ii5!sh
    var hashedCode = Hash(code);
    var dataPackage = {
       senderId : senderId,
       recipientId : recipientId,
       when : new Date( ),
       expiration : expiration,
       hashedCode : hashedCode,
       data : data
    DB.save(dataPackage)
    var retrievalURL = RETREIVAL URL + "?code=" + code;
    var redirectURL = destinationURL + "retrievalURLRTz" +
    encodeURl(retrievalURL);
    // Redixt
    response.writeHead(302, {
        'Location' : redirectURL
    });
    response.end( );
;
// Code Flow or Encrypted Packet Flow Retrieval and Response
exports.retreiveData = function(clientToken, code){
    if ( ! IsAuthorized(clientToken)){
        response.writeHead(401);
        response.end( );
    var hashedCode = Hash(code);
    var recipientId = GetClientId(clientToken);
var dataPackage = DB.findByHashedCodeAndRecipientId
(hashedCode, recipientId);
    if(dataPackage.expiration && dataPackage.expiration <
    new Date( )){
        response.writeHead(410);
        response.end( );
        return dataPackage.data;
    1;
                     ecs,ddi
exports.publishData = function(clientToken, data, recipientId){
    if(!IsAuthorized(clientToken)){
        response.writeHead(401);
        response.end( );
    var senderId = GetClientId(clientToken);
    var dataPackage = {
       senderId : senderId,
       recipientId : recipientId,
       when : new Date( ),
       data : data
    app.publish(recipientId, "update", dataPackage)
    return "sueces ,
    1;
```

Figure 18:
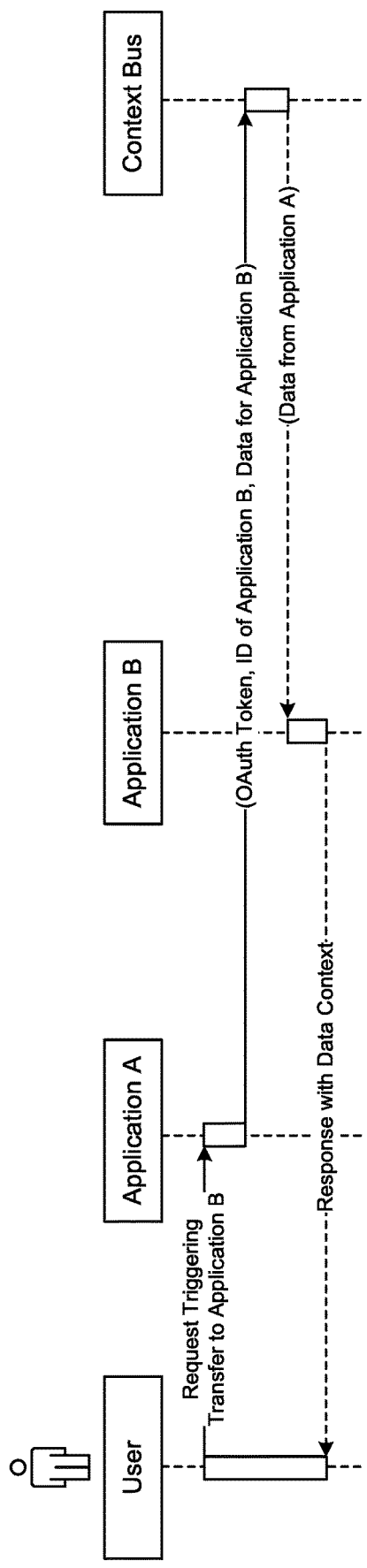
FIG. 18 illustrates a process for using publish subscriber flow, according to an embodiment of the invention.

FIG. 18 illustrates a process for using publish subscriber flow, according to an embodiment. The publish subscriber flow may be used when the sending application wants to send data to the receiving application but does not want to redirect the user. The sending application (Application A) and the receiving application (Application B) can have established a trust with the context bus (e.g. OAuth token or pre-shared secret). Application B can subscribe to the context bus to receive event notifications. Application A can post the data to the context bus publication endpoint, along with relevant information such as authentication token and/or key, and recipient ID. Based on the recipient ID, the context bus can publish the data to the correct application subscription.

Applications wishing to provide context when directing users to Corus Northern Engineering Services (CORUS) can use the context bus to pass data. For example, when an EMR system provides a user with a link to a patient related chat room in CORUS, the patient identifier can be sent to the context bus using either the code flow and/or the encrypted packet flow. When the user loads CORUS, the data packet containing the patient identifier can be retrieved from the context bus and CORUS can route the user to the appropriate room.

The publication subscription model can be used by applications that want to transfer data to CORUS but not redirect the user. An example is triggering the CORUS application to open a patient related chat room for a user who has the application open in a browser or mobile app.

Utilizing the context bus, CORUS or other applications may be able to access encrypted data using a short URL without sending identifiable data or parameters for a patient or other subject matter.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   performing processing associated with receiving, at a messaging server, message data;
   performing processing associated with receiving, with the messaging server, patient data comprising patient identifying information, wherein the patient identifying information is specified by a user and contained in the message data;
   performing processing associated with determining, with the messaging server, plural recipients based on the patient identifying information by accessing an electronic medical records (EMR) system via a web interface and dynamically creating a patient object that is uniquely named according to the patient identifying information, the patient object comprising at least one channel available for communications in a context of a particular patient that defines the plural recipients for a message associated with the particular patient's medical treatment;
   performing processing associated with determining, with the messaging server, a plurality of endpoint protocols for a plurality of recipient devices associated with the plural recipients;
   performing processing associated with generating, with the messaging server, a plurality of formatted messages comprising same or similar message data, each formatted message being formatted according to a different one of the plurality of endpoint protocols for the plurality of recipient devices; and performing processing associated with sending, with the messaging server, the plurality of formatted messages to the plurality of recipient devices, wherein each formatted message is transmitted to a particular recipient device of the plurality of recipient devices using a particular endpoint protocol of the plurality of endpoint protocols;

wherein when a secure connection does not exist with the particular recipient device, the messaging server sends a particular formatted message of the plurality of formatted messages to the particular recipient device with a Uniform Resource Locator (URL) and the particular recipient device retrieves the particular formatted message within a web browser of the particular recipient device using the URL.

2. The method of claim 1, further comprising:
performing processing associated with encrypting, with the messaging server, the plurality of formatted messages;
wherein an encryption key for decrypting the encrypted plurality of formatted messages is stored at a location separate from the messaging server.

3. The method of claim 1, wherein the patient identifying information comprises: user name, user identification (ID), contact number, group name, group ID, patient name, patient unit identifier, patient bed identifier, patient identifier, medical record number (MRN), user-defined tag, predefined tag, unit, consultation data, role, or a combination thereof.

4. The method of claim 1, wherein the plurality of recipient devices comprise at least one of a pager, a cell phone, a voice over internet protocol phone, a personal computer, a laptop, a tablet, a mobile device, or a combination thereof.

5. The method of claim 1, wherein the plurality of endpoint protocols comprise at least one of a simple mail transfer protocol, a wireless communication transfer protocol, a simple network paging protocol, a short message service protocol, a multimedia message service protocol, a voice over internet protocol, a push notification service protocol, a cloud messaging protocol, or a combination thereof.

6. The method of claim 1, further comprising:
performing processing associated with receiving, with the messaging server, recipient data comprising a plurality of recipients for the message data, wherein each formatted message is addressed to a separate one of the plurality of recipients; and
performing processing associated with ranking, with the messaging server, the plurality of formatted messages, wherein the plurality of formatted messages are sent in order of rank.

7. The method of claim 1, wherein the messaging server provides bi-directional individual and group messaging between providers and care teams in a web and mobile context.

8. The method of claim 1, wherein the messaging server works as a companion to the electronic medical records.

9. The method of claim 1, wherein web services available from the EMR and/or healthcare interoperability resources (FHIR) are implemented through objects that are uniquely named using the patient identifying information.

10. The method of claim 1, wherein a first user uses the messaging server and a user interface available via the web browser to send the plurality of formatted messages to: a second user on a Voice over Internet Protocol (VoIP) phone, a third user on a pager, and a fourth user on a smartphone.

11. The method of claim 1, wherein the messaging server prioritizes message transmission based on individual items, message types, and available downstream applications.

* * * * *